United States Patent Office 3,065,252
Patented Nov. 20, 1962

3,065,252
CATALYTIC PREPARATION OF CHLOROSILOXANES
Paul L. Brown, Saginaw, and James Franklin Hyde, Midland, Mich., assignors to Dow Corning Corporation, Midland, Mich., a corporation of Michigan
No Drawing. Filed Dec. 6, 1960, Ser. No. 73,973
2 Claims. (Cl. 260—448.2)

This invention relates to the interaction of a halogenosilicon compound with an organosiloxane in contact with certain catalysts.

The equilibrium reactions of halogenosilanes with organosiloxanes are well-known as evidenced by the disclosure of U.S. Patent 2,421,653. However, this type of reaction has several undesirable features. First, there is always some unreacted halogenosilane and organosiloxane. Second, the equilibrium conditions are so severe as to cause the cleavage of groups such as the phenyl and vinyl radicals from the silicon atoms. For example, where no catalyst is employed, it is necessary to heat the reactants under pressure long hours at high temperatures. Where such conditions are impractical so that a catalyst is necessary, the recommended hydrogen halide or Lewis acid catalysts presently recognized in the art are well known for rearranging SiOSi bonds as well as cleaving organic radicals from silicon atoms to which they are attached. The search for a non-bond-rearranging catalyst which would bring the halogenosilane-organosiloxane reaction to completion has been intense.

The primary object of this invention is to provide a catalytic system for the reaction of halogenosilanes or halogenosiloxanes with organosiloxanes without bond-rearrangement or group cleavage. Another object is to provide an essentially acid-free system for the above type of reaction. Another object is to provide such a system whereby controlled copolymerization is possible. These objects are satisfied by this invention.

This invention relates to the method of interaction of a silane or siloxane containing one halogenated silicon atom per molecule with a siloxane having an average degree of substitution of from two to three atoms or radicals per silicon atom in contact with certain catalysts.

More specifically, this invention relates to the method which comprises interacting (A) a silicon compound containing per molecule at least one silicon atom having attached thereto at least one halongen atom and no more than two organic radicals selected from the group consisting of monovalent hydrocarbon radicals, halogenoaromatic monovalent hydrocarbon radicals and fluorinated aliphatic monovalent hydrocarbon radicals, any remaining valences of said silicon atom being satisfied by substituents selected from the group consisting of silicon-bonded oxygen atoms and hydrogen atoms, any other silicon atoms in said compound having their valences satisfied by substituents selected from the group consisting of silicon-bonded oxygen atoms, hydrogen atoms, monovalent hydrocarbon radicals, halogenoaromatic monovalent hydrocarbon radicals and fluorinated aliphatic monovalent hydrocarbon radicals, with (B) an organosiloxane containing per silicon atom an average of from two to three monovalent substituents selected from the group consisting of hydrogen atoms, hydrocarbon radicals, halogenoaromatic hydrocarbon radicals and fluorinated aliphatic hydrocarbon radicals, any siloxane (B) which has two of said monovalent substituents attached to each silicon atom containing at least four such silicon atoms, any remaining silicon valences being satisfied by silicon-bonded oxygen atoms, in contact with (C) a catalyst selected from the group consisting of aminoalkyl-substituted organosilicon compounds, salts of monocarboxylic acids and said aminoalkyl-substituted organosilicon compounds, salts of hydrogen halides and said aminoalkyl-substituted organosilicon compounds, aliphatic hydrocarbon amines containing per molecule at least 10 carbon atoms, salts of hydrogen halides and said aliphatic hydrocarbon amines, salts of monocarboxylic acids and aliphatic hydrocarbon amines, said salts containing at least 10 carbon atoms per molecule, salts of monocarboxylic acids and hydrocarbon-substituted quaternary ammonium hydroxides, said salts containing at least 10 carbon atoms per molecule, and salts of hydrogen halides and hydrocarbon-substituted quaternary ammonium hydroxides, said salts containing at least 18 carbon atoms per molecule, whereby a halogen atom from a molecule of A replaces an oxygen atom attached to a silicon atom in a molecule of B and the remainder of said A molecule attaches to the free oxygen bond in the remainder of the original B molecule.

Organosilicon compound A can be a silane containing one to four halogen atoms or a siloxane containing from one halogen atom per molecule to three halogen atoms per silicon atom. The remaining valences of the silicon valences in compound A can be satisfied by any of certain monovalent substituents. Compound A can be silane of the formula, for example, $XSiR_2H$, $XSiRH_2$, $XSiH_3$, $X_2SiR_2$, $X_2SiHR$, $X_2SiH_2$, $X_3SiR$, $X_3SiH$ or $X_4Si$ in which each X is a halogen atom and each R is a subsequently-defined organic radical. Compound A can also be a siloxane made up, for example, of any combination of the following siloxane units: $SiR_3O_{0.5}$, $SiHR_2O_{0.5}$, $SiH_2RO_{0.5}$, $SiH_3O_{0.5}$, $SiR_2O$, $SiHRO$, $SiH_2O$, $SiHO_{1.5}$, $SiRO_{1.5}$, $SiO_2$, $SiR_2XO_{0.5}$, $SiHRXO_{0.5}$, $SiH_2XO_{0.5}$, $SiRXO$, $SiHXO$, $SiXO_{1.5}$, $SiX_2O$ or $SiX_3O_{0.5}$ units in which each X is a halogen atom and each R is a subsequently-defined organic radical. However, there must be at least one halogenated siloxane unit in any siloxane employed as compound (A).

Organosiloxane B can be any cyclic siloxane of at least four silicon atoms or any linear siloxane containing per silicon atom an average of from two to three of certain monovalent substituents. More specifically, organosiloxane B can be any siloxane made up, for example, of any combination of the following siloxane units: $SiR_3O_{0.5}$, $SiHR_2O_{0.5}$, $SiH_2RO_{0.5}$, $SiH_3O_{0.5}$, $SiR_2O$, $SiHRO$, $SiH_2O$, $SiHO_{1.5}$, $SiRO_{1.5}$, or $SiO_2$ units in which each R is a subsequently-defined organic radical.

The organic radicals R which can be present in A and B include monovalent hydrocarbon radicals, monovalent halogenoaromatic hydrocarbon radicals and monovalent fluorinated aliphatic hydrocarbon radicals.

More specifically, each R can be, for example, any alkyl radical such as the methyl, ethyl, isopropyl, isobutyl, tert-butyl, 2-ethylhexyl, dodecyl, octadecyl and myricyl radicals; any alkenyl radical such as the vinyl, allyl and hexadienyl radicals; any cycloalkyl radical such as the cyclopentyl and cyclohexyl radicals; any cycloalkenyl radical such as the cyclopentenyl and cyclohexenyl radicals; any aryl hydrocarbon radical such as the phenyl, naphthyl and xenyl radicals; and aralkyl radical such as the benzyl, phenylethyl and xylyl radicals and any alkaryl radical such as the tolyl and dimethylphenyl radicals. These monovalent hydrocarbon radicals can also contain aromatic halogen atoms such as, for example, in the 2,4,6-trichlorobenzyl, perchlorophenyl, 2-bromonaphthyl, p-iodo-phenylethyl and p-fluorophenyl radicals; and aliphatic fluorine atoms such as, for example, in the 3,3,3-trifluoropropyl, $\alpha,\alpha,\alpha$-trifluorotolyl, 3,3,4,4,5,5,5-heptafluoropentyl and 5,5,5-trifluoro-2-trifluoromethylamyl radicals.

In the reaction of this invention a halogen atom from a molecule of A replaces an oxygen atom attached to a silicon atom in a molecule of B and the remainder of said A molecule attaches to the free oxygen bond in the remainder of the original B molecule. Some examples of this reaction include:

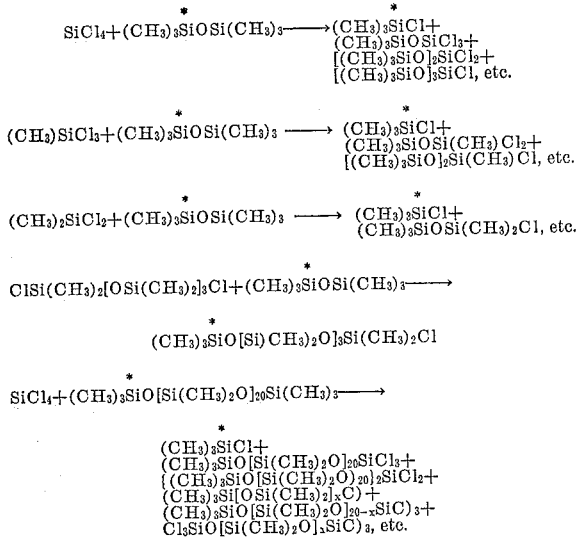

where $x$ is less than 20.

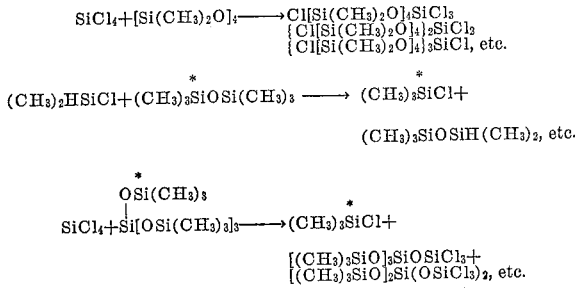

In the above reactions the methyl radicals can be replaced by any other of the above-defined R radicals. Similarly, the chlorine atoms can be replaced by other halogen atoms, e.g. bromine, iodine or fluorine, although chlorine is preferred.

The inventive feature of the method of this invention resides in the use as catalysts of the well-known compounds described below. These include aminoalkyl-substituted ogganosilicon compounds, salts of monocarboxylicacids and said aminoalkyl-substituted organosilicon compounds, salts of hydrogen halides and said aminoalkyl-substituted organosilicon compounds, aliphatic hydrocarbon amines containing per molecule at least 10 carbon atoms, salts of hydrogen halides and said aliphatic hydrocarbon amines, salts of monocarboxylic acids and aliphatic hydrocarbon amines, said salts containing at least 10 carbon atoms per molecule, quaternary ammonium carboxylates containing at least 10 carbon atoms per molecule and quaternary ammonium halides containing at least 18 carbon atoms. The limitation on the number of carbon atoms in the various catalysts represents a compatibility factor which in turn affects the activity of each catalyst.

More specifically, these catalysts include, for example, sym-bis(gamma-aminopropyl)tetramethyldisiloxane, gamma[(β-aminoethyl) amino] propyldiphenylmethylsilane, $(CH_3)_3SiOSi(CH_3)_2CH_2CH_2CH_2NH_2 \cdot HCl$,

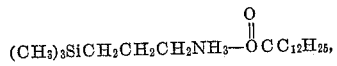

triphenylsilpropylamine formate, trimethylsiloxydiemthyl-silhaxyamine hexoate, tri-n-butylamine, triamylamine, dicyclohexylamine, didodecylamine, octadecylamine, commercial amine mixtures made up of aliphatic hydrocarbon amines containing at least about 12 carbon atoms per molecule,

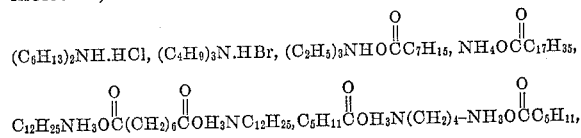

$H_2NCH_2CH_2NHCH_2CH_2NH_3O\overset{O}{\overset{\|}{C}}C_{15}H_{31}$, di-2-ethylhexylamine acetate tri-n-butylamine acrylate, diethylene triamine monooleate, diisopropylamine palmitate, trimethylamine stearate, 2,5-dimethylpiperazine octoate, di(octadecylamine) sebacate, ethylenediamine di-hexoate, benzyltrimethylammonium acetate, tetramethyl-ammonium 2-ethylhexoate, distearyl dimethyl ammonium chloride, cetyl dimethylebenzyl ammonium chloride, a mixture of dioctadecyldimethylammonium chloride and dihexadecyldimethylammonium chloride and commercially available n-alkyl trimethyl ammonium halides containing at least about 18 carbon atoms.

The amount of catalyst is not critical although from about 0.05 to about 2 percent by weight based on the combined weight of A and B is preferred. Less than about 0.05 percent of catalyst is impractical due to reduction of reaction rate. More than about 2 percent by weight of catalyst is unnecessary but can be employed.

The method of this invention is operative at room temperature, but the rate of interaction can be increased in some instances by heating the system. However, generally temperatures of more than about 150° C. are not desirable.

The method of this invention can be done in a solvent-free state or in inert organic solvent. Ordinarily, hydrocarbon solvents such as benzene, hexane, soluene, xylene and the like can be employed. However, the efficiency of the method of this invention is improved by the use of a polar solvent. One measure of solvent polarity is the static dielectric constant. The hydrocarbon solvents described above have static dielectric constants of less than about 3. Halogenated hydrocarbons as well as ethers generally have static dielectric constants greater than 4. The introduction of nitrogen atoms into the solvent molecular structure as in nitrile groups, nitro groups and amide groups raises the static dielectric constants of such solvents to above 10. The term inert excludes such functions as, for example, the hydroxyl group, the thiol group, ketones which enolize to give hydroxyl groups and primary and secondary amine groups.

For this invention a suitable inert polar solvents is one which has a static dielectric constant greater than about 4 and preferably greater than 10. Such solvents include, for example, chloroform, bromoform, dichloromethane, iodomethane, dibromomethane, 1,1,1-trichloroethane, o-dibromobenzene, p-fluorotoluene, methylbutyl ether, the dimethyl ether of ethylene glycol, tetrahydrofuran, β,β'-dichlorodiethyl ether, acetonitrile, propionitrile, butyronitrile, valeronitrile, benzonitrile, cyclohexonitrile, capronitrile, succinonitrile, ethoxyacetylene, pyridine, nitrtomethane, nitroethane, nitropropane, nitrooctane, nitrobenzene, nitrotoluene, nitrocyclohexane, 1-chloro-2-nitrobenzene, formamide, acetamide, dimethylformamide, dimethylacetamide, tetramethylurea and ethyl carbamate.

The method of this invention is useful for introducing functionality in the form of silicon-bonded halogen atoms into molecules where no such functionality previously existed. Thus, a comparatively inert material can be converted to an active material useful, for example, as a cross-linking agent in a rubber or resin.

The following examples are illustrative of the best method of practicing this invention but are not intended to limit this invention which is properly delineated in the claims. The symbols, Me, Et, Vi and Ph represent the methyl, ethyl, vinyl and phenyl radicals.

EXAMPLE 1

A mixture of 50 grams of hexamethyldisiloxane, 10 grams of tetrachlorosilane and about 0.14 gram of tri-n-butylamine was allowed to stand at room temperature in a closed system (a glass bottle with a screw cap) for 72 hours and was found by infrared analysis to contain no detectable tetrachlorosilane and 13.9 percent by weight trimethylchlorosilane. This showed that the tetrachlorosilane had cleaved the siloxane linkage of the hexamethyldisiloxane to produce $Me_3SiCl$ plus a mixture of such materials as $Me_3SiOSiCl_3$, $(Me_3SiO)_2SiCl_2$, $(Me_3SiO)_3SiCl$ and $(Me_3SiO)_4Si$.

EXAMPLE 2

To a mixture A of 79.25 percent by weight hexamethyldisiloxane and 20.75 percent by weight of tetrachlorosilane was added 0.1 percent by weight of tri-isoamylamine. The mixture stood for 112 hours at room temperature in a closed system and was found by infrared analysis to contain 15.9 percent by weight trimethylchlorosilane and no tetrachlorosilane. This conforms to the reaction $$SiCl_4 + n(R_3Si)_2O \rightarrow nR_3SiCl + (R_3SiO)_nSiCl_{4-n}$$

in which $n$ has an average value of 1.196 and each R in this case is the methyl radical.

This experiment was repeated employing tri-n-butylamine in place of the tri-isoamylamine plus approximately 7.8 percent by weight acetonitrile based on the weight of the disiloxane-chlorosilane mixture. Infrared analysis of the product showed no tetrachlorosilane and 34.1 percent by weight trimethylchlorosilane corresponding to an average value for $n$ of 2.78 in the above equation.

EXAMPLE 3

To mixture A of Example 2 was added 0.1 percent by weight based on the weight of mixture A of a commercial mixture of di-n-alkylamines containing at least 12 carbon atoms per molecule. After 115 hours at room temperature in a closed system the mixture was found by infrared analysis to contain no tetrachlorosilane and 23.6 percent by weight trimethylchlorosilane. The other products $Me_3SiOSiCl_3$, $(Me_3SiO)_2SiCl_2$ and $(Me_3SiO)_3SiCl$ This experiment was repeated with 0.1 percent by weight of the same commercial mixture of di-n-alkylamines in combination with 15.6 percent by weight of acetonitrile giving similar products with no tetrachlorosilane remaining and containing 30.2 percent by weight $Me_3SiCl$ showing the reaction had occurred as predicted in Example 2.

EXAMPLE 4

Various mixtures were prepared as shown below. The mixtures were allowed to react at room temperature in a closed system for 115 hours after which they were checked by infrared analysis for trimethylchlorosilane and tetrachlorosilane. The results showed that the reactions followed the equation set forth in Example 2.

Table I

| Parts by weight initially | | | | Percent by weight in product | | |
|---|---|---|---|---|---|---|
| $Me_6Si_2O$ | $SiCl_4$ | MeCN | $Bu_3N$ | $SiCl_4$ | $Me_3SiCl$ | $n$[1] |
| 13.32 | 7.00 | 1.72 | 0.14 | 0 | 40.8 | 2.01 |
| 20.00 | 7.17 | 1.91 | 0.14 | 0 | 40.1 | 2.545 |
| 19.05 | 5.00 | 1.79 | 0.14 | 0 | 32.1 | 2.6 |
| 20.00 | 2.29 | 1.85 | 0.14 | 0 | 15.2 | 2.505 |

[1] In equation shown in Example 2.

EXAMPLE 5

A mixture of 60.8 grams of hexamethyldisiloxane, 14.7 grams of tetrachlorosilane, 26.64 grams of tetrahydrofuran and 0.28 gram of triisoamylamine was allowed to stand at room temperature in a closed system for 312 hours. Infrared analysis showed that there was no tetrachlorosilane remaining in the product and that there was 20.6 percent by weight trimethylchlorosilane corresponding to an average value of 2.29 for $n$ in the equation of Example 2.

EXAMPLE 6

A mixture of 33.8 grams of hexamethyldisiloxane, 8.4 grams of tetrachlorosilane and 0.2 gram of di-n-hexylamine hydrochloride was allowed to stand at room temperature in a closed system for about 90 hours. Infrared analysis showed that there was a little tetrachlorosilane remaining in the product and 11.2 percent by weight of trimethylchlorosilane. The other principal reaction product was $Me_3SiOSiCl_3$.

Similar results are obtained when $$(CH_3)_3SiOSi(CH_3)_2CH_2CH_2CH_2NH_2 \cdot HCl$$

is substituted mol per mol for the di-n-hexylamine hydrochloride above.

EXAMPLE 7

15 grams of the following disiloxanes were mixed with the amounts shown of tetrachlorosilane, acetonitrile and tri-n-butylamine. Each of the mixtures after standing in a closed system for 240 hours at room temperature were checked by infrared analysis for tetrachlorosilane and the triorganochlorosilane corresponding to the starting disiloxane. The results were as follows:

Table II

| Disiloxane | $SiCl_4$ (gms.) | MeCN (gms.) | $Bu_3N$ (gms.) | Product | | |
|---|---|---|---|---|---|---|
| | | | | $SiCl_4$ (percent) | $R_3SiCl$ (percent) | $n$[1] |
| $(PhMeViSi)_2O$ | 2.06 | 1.7 | 0.14 | 0 | 10 | 0.85 |
| $(PhMe_2Si)_2O$ | 2.08 | 1.7 | 0.14 | 0 | 24 | 2.15 |
| $(Et_3Si)_2O$ | 2.59 | 1.65 | 0.14 | 0 | 27 | 2.26 |

[1] In equation shown in Example 2.

EXAMPLE 8

16.25 grams of hexamethyldisiloxane, 5.00 grams of methyltrichlorosilane, 2.14 grams of acetonitrile and 0.14 gram of tri-n-butylamine were mixed together and allowed to stand in a closed system at room temperature for 250 hours after which the product was found by infrared analysis to contain no methyltrichlorosilane and 37.1 percent by weight of trimethylchlorosilane. This showed that the following reaction had taken place:

$$Me_3SiOSiMe_3 + MeSiCl_3 \longrightarrow Me_3SiCl + Me_3SiOSiMeCl_2 + [Me_3SiO]SiMeCl, \text{ etc.}$$

EXAMPLE 9

A mixture was prepared of 592 grams of octamethylcyclotetrasiloxane, 149.5 grams of monomethyltrichlorosilane, 211.5 grams of monophenyltrichlorosilane, 100 grams of acetonitrile and approximately 1 gram of tri-n-butylamine. This mixture was refluxed for two weeks after which no monomethyltrichlorosilane nor monophenyltrichlorosilane was evident by infrared analysis.

The product was diluted with diethyl ether, hydrolyzed by standard procedure and stripped of solvent and excess octamethylcyclotetrasiloxane. The stripped copolymer product was found by infrared analysis to contain 8 mol percent monomethylsiloxane units, 14 mol percent monophenylsiloxane units and 78 mol percent dimethylsiloxane units.

EXAMPLE 10

A mixture of 100 grams of $Cl(Me_2SiO)_3SiMe_2Cl$, 92.5 grams of hexamethyldisiloxane and 1 gram of a mixture of 70 percent by weight dioctadecyldimethyl ammonium chloride and 30 percent by weight of dihexadecyldimethyl ammonium chloride was refluxed for about 16 hours and distilled yielding a 48 gram fraction found by infrared analysis to contain about 98.7 percent by weight Me$_3$SiCl and 1.3 percent by weight hexamethyldisiloxane. This proves the presence of the following reaction:

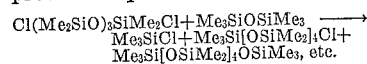

Cl(Me$_2$SiO)$_3$SiMe$_2$Cl+Me$_3$SiOSiMe$_3$ ⟶
   Me$_3$SiCl+Me$_3$Si[OSiMe$_2$]$_4$Cl+
   Me$_3$Si[OSiMe$_2$]$_4$OSiMe$_3$, etc.

EXAMPLE 11

Equal volumes of hexamethyldisiloxane and dimethylhydrogenchlorosilane were mixed with at least 0.1 percent by weight of the catalyst employed in Example 10 based on the combined weight of siloxane and silane. After 20 hours at room temperature the system was found by infrared spectrum analysis to contain at least 26.8 percent by weight of trimethylchlorosilane showing a reaction had taken place:

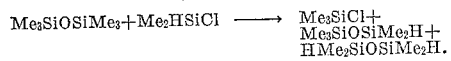

Me$_3$SiOSiMe$_3$+Me$_2$HSiCl ⟶ Me$_3$SiCl+
   Me$_3$SiOSiMe$_2$H+
   HMe$_2$SiOSiMe$_2$H.

EXAMPLE 12

When the following mixtures of halogenated silicon compounds A, organosiloxanes B and catalysts C are allowed to stand at room temperature in a closed system for 115 hours, the identifiable product shown is produced showing that a reaction has taken place between A and B, whereby a halogen atom from a molecule of A replaces an oxygen atom attached to a valence of a silicon atom in a molecule of B.

of silicon-bonded oxygen atoms and hydrogen atoms, any other silicon atoms in said compound having their valences satisfied by substituents selected from the group consisting of silicon-bonded oxygen atoms, hydrogen atoms, monovalent hydrocarbon radicals, halogenoaromatic monovalent hydrocarbon radicals and fluorinated aliphatic monovalent hydrocarbon radicals, with (B) an organosilane containing per silicon atom an average of from two to three monovalent substituents selected from the group consisting of hydrogen atoms, hydrocarbon radicals, halogenoaromatic hydrocarbon radicals and fluorinated aliphatic hydrocarbon radicals, any siloxane (B) which has two of said monovalent substituents attached to each silicon atom containing at least four such silicon atoms, any remaining silicon valences being satisfied by silicon-bonded oxygen atoms, in contact with (C) a catalyst selected from the group consisting of aminoalkyl-substituted organosilicon compounds, salts of monocarboxylic acids and said aminoalkyl-substituted organosilicon compounds, salts of hydrogen halides and said aminoalkyl-substituted organosilicon compounds, aliphatic hydrocarbon amines containing per molecule at least 10 carbon atoms, salts of hydrogen halides and said aliphatic hydrocarbon amines, salts of monocarboxylic acids and aliphatic hydrocarbon amines, said salts containing at least 10 carbon atoms per molecule, salts of monocarboxylic acids and hydrocarbon-substituted quaternary ammonium hydroxides, said salts containing at least 10 carbon atoms per molecule, and salts of hydrogen halides and hydrocarbon-substituted quaternary ammonium hydroxides, said salts containing at least 18 carbon atoms per molecule, whereby a halogen atom from a molecule of A replaces an oxygen atom attached to a silicon atom in a molecule of B and the remainder of said

Table III

| B | Parts by weight | A | Parts by weight | C | Parts by weight | Product |
|---|---|---|---|---|---|---|
| Me$_3$SiO(SiMe$_2$O)$_{100}$SiMe$_3$ | 75 | SiCl$_4$ | 8.5 | (H$_2$NCH$_2$CH$_2$CH$_2$SiMe$_2$)$_2$O | 1 | Me$_3$SiCl. |
| (Me$_3$SiO)$_4$Si | 38 | C$_{18}$H$_{37}$SiBr$_3$ | 15 | C$_{18}$H$_{37}$NH$_2$ | 2 | Me$_3$SiBr. |
| (CF$_3$CH$_2$CH$_2$SiMe$_2$)$_2$O | 33 | CF$_3$CH$_2$CH$_2$SiCl$_3$ | 8 | (C$_8$H$_{17}$)$_2$NH·HOCMe (C=O) | 0.5 | CF$_3$CH$_2$CH$_2$SiMe$_2$Cl. |
| (Cl$_2$C$_6$H$_3$SiMe$_2$)$_2$O | 43 | BrC$_6$H$_4$SiCl$_3$ | 10 | (C$_2$H$_5$)$_3$NHOCC$_7$H$_{15}$ (C=O) | 0.2 | Cl$_2$C$_6$H$_3$SiMe$_2$Cl. |
| (C$_6$H$_5$CH$_2$SiMe$_2$)$_2$O | 31 | ViSiCl$_3$ | 5 | Me$_3$SiCH$_2$CH$_2$CH$_2$NH$_3$—O—CC$_{12}$H$_{25}$ (C=O) | 0.3 | C$_6$H$_5$CH$_2$SiMe$_2$Cl. |
| (C$_{18}$H$_{37}$SiMe$_2$)$_2$O | 64 | C$_6$H$_{11}$SiCl$_3$ | 7 | Me$_4$NOCC$_7$H$_{15}$ (C=O) | 0.7 | C$_{18}$H$_{37}$SiMe$_2$Cl. |
| (Me$_3$Si)$_2$O | 16 | SiCl$_4$ | 4 | NH$_4$OCC$_{17}$H$_{35}$ (C=O) | 1 | Me$_3$SiCl. |
| (Me$_3$Si)$_2$O | 16 | SiCl$_4$ | 4 | (C$_{18}$H$_{37}$)$_2$Me$_2$NOCMe (C=O) | 1.5 | Me$_3$SiCl. |
| (Me$_3$Si)$_2$O | 16 | SiCl$_4$ | 4 | (C$_7$H$_{15}$COH·NH$_2$CH$_2$—)$_2$ (C=O) | 0.1 | Me$_3$SiCl. |

That which is claimed is:

1. The method which comprises interacting (A) a silicon compound containing per molecule at least one silicon atom having attached thereto at least one halogen atom, and no more than two organic radicals selected from the group consisting of monovalent hydrocarbon radicals, halogenoaromatic monovalent hydrocarbon radicals and fluorinated aliphatic monovalent hydrocarbon radicals, any remaining valences of said silicon atom being satisfied by substituents selected from the group consisting A molecule attaches to the free oxygen bond in the remainder of the original B molecule.

2. The method of claim 1 in contact with (D) an inert polar solvent.

References Cited in the file of this patent

UNITED STATES PATENTS 2,421,653    Sauer                June 3, 1947

UNITED STATES PATENT OFFICE
CERTIFICATE OF CORRECTION

Patent No. 3,065,252                          November 20, 1962

Paul L. Brown et al.

It is hereby certified that error appears in the above numbered patent requiring correction and that the said Letters Patent should read as corrected below.

Column 1, line 47, for "halongen" read -- halogen --; column 3, lines 24, 25 and 26 should appear as shown below instead of as in the patent:

$$(CH_3)_3Si[OSi(CH_3)_2]_xCl+$$

$$(CH_3)_3SiO[Si(CH_3)_2O]_{20-x}SiCl_3+$$

$$Cl_3SiO[Si(CH_3)_2O]_xSiCl_3, \text{ etc.}$$

line 73, for "silhaxylamine" read -- silhexylamine --; column 5, line 45, after "products" insert -- included --; column 8, line 7, for "organosilane" read -- organosiloxane --.

Signed and sealed this 10th day of December 1963.

(SEAL)
Attest:
ERNEST W. SWIDER

Attesting Officer

EDWIN L. REYNOLDS
                                    Acting Commissioner of
                                               Patents